B. F. & A. L. GILLILAND.

Wheel-Plow.

No. 52,990.

Patented Mar. 6, 1866.

Witnesses:
Thomas J. Gardner
Philip T. Dodge

Inventors:
B. F. & A. L. Gilliland
By W. C. Dodge
Attorney.

UNITED STATES PATENT OFFICE.

A. L. GILLILAND AND B. F. GILLILAND, OF LITTLETON, ILLINOIS.

IMPROVEMENT IN GANG-PLOWS.

Specification forming part of Letters Patent No. 52,990, dated March 6, 1866.

*To all whom it may concern:*

Be it known that we, B. F. GILLILAND and A. L. GILLILAND, of Littleton, in the county of Schuyler and State of Illinois, have invented certain new and useful Improvements in Gang-Plows; and we do hereby declare that the following is a full, clear, and exact description thereof, reference being had to the accompanying drawings, making part of this specification, in which—

Figure 1:
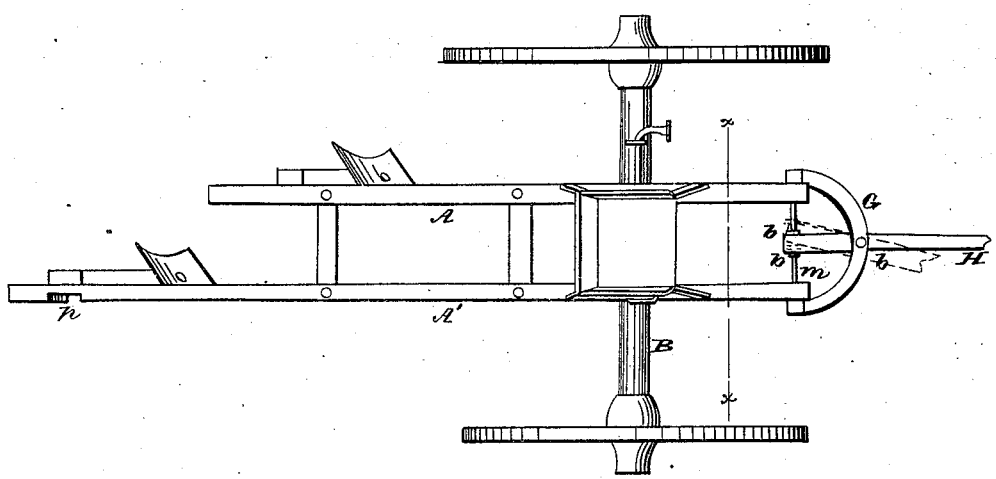
Figure 2:
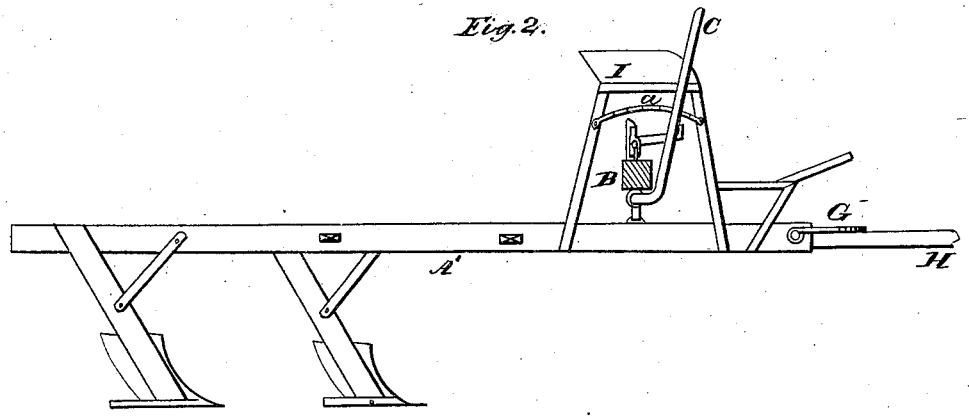

Figure 1 is a top-plan view; Fig. 2, a side elevation, and Fig. 3 a front view taken on the line x x of Fig. 1.

The nature of our invention consists in a novel arrangement of devices for regulating the depth and inclination of the plows, and also in a novel arrangement for adjusting the tongue so as to throw the plows to or from the land.

To enable others skilled in the art to construct and use our invention, we will proceed to describe it.

A A' represent two beams connected by cross-bars, as shown in Fig. 1, and having a plow attached to each, in the usual manner. An axle, B, is provided having two wheels, one of which is larger than the other and intended to run in the furrow.

Figure 3:
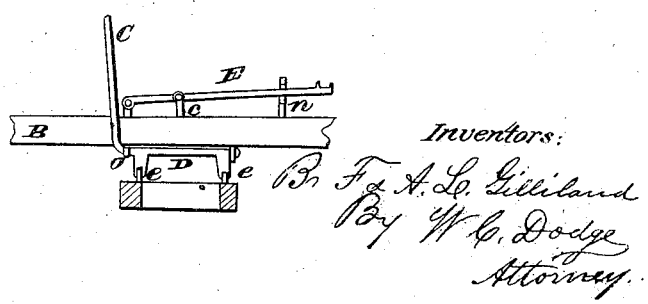

The beams A, near their front ends, are attached to the under side of the axle B by means of the rock-shaft D, the short arms e of which are secured to the beams by staples, as shown in Fig. 3, one end of the shaft D working in an eye or staple secured rigidly to the under side of the axle, the opposite end working in the eye of a bolt, o, which passes loosely through a hole in the axle, its upper end being pivoted to the end of a lever, E, fulcrumed at c and having its opposite end secured by notches in the face of the stud n.

To the end of rock-shaft D a lever, C, is secured, which extends vertically up by the side of the seat I, as shown in Fig. 2. A bar, a, having notches cut in its edge or face, is secured to the side of the frame on which the seat is mounted in such a position that the lever C may be secured therein, as desired.

By operating the lever C the short arms e of the rock-shaft D may be made to move in the arc of a circle, and thereby raise or lower the front ends of the beams, and the plows thus caused to run in or out of the ground at pleasure. When adjusted to the proper depth the lever C is permitted to rest in one of the notches in the bar a; but when near the end of the furrow the lever C is thrown back by the driver mounted on the seat, and the points of the plows being thus raised will cause the plows to run to the surface ready for turning around.

By depressing the end of the lever E the two beams may be raised on a level with each other, as shown in Fig. 3, which is the proper position for plowing on level land; but if the land to be plowed is side-hill or inclined, then, by raising the end of lever E, the beam with its plow at the opposite side will be correspondingly depressed to adapt it to inclination of the surface. By operating the lever E the plows may also be adjusted as to depth on level land in case they cannot be sufficiently adjusted by lever C.

To the front end of the beams A the tongue H is secured by means of the bolt m and segment G, the tongue being pivoted to the latter at b. The bolt m passes loosely through the end of the tongue, and has a jam-nut, l, on it at each side of the tongue, as shown in Fig. 1. By moving the nuts l either to the right or left on the rod m the tongue can be adjusted as desired, and the plows thus thrown to or from the land, and thereby made to cut a wider or narrower furrow, as may be desired.

The beam A' has a "gain" or recess cut in its side opposite to where the plow-standard is attached, as shown at p of Fig. 1. The object of this is to allow the plow on that beam to be shifted or changed to that side of the beam, and remove it eight inches (more or less) farther from the adjoining plow. This is specially intended for plowing land for spring crops where crops were grown the previous season, and in which cases it is not necessary to break up and pulverize all portions of the soil as thoroughly as in other cases.

When thus arranged it is obvious that the furrow-slice turned by the plow on beam A' will not be thrown entirely into the furrow formed by the other plow which precedes it, but will be left lying (more or less) on top of an undisturbed portion of the soil left between the two plows, thus practically performing the operation technically described as "cutting and covering." This manner of preparing the soil in the cases alluded to is found to operate very successfully, especially where the land is free from turf or weeds, and saves one-third of the time and labor required to plow the land in the usual manner. This in the Northwest, where the spring seed-time is necessarily brief and where spring-wheat is generally grown, is very important.

By these means we are enabled to produce a very cheap, simple, and efficient plow, and one that is specially adapted to the wants of the farmers of the region where it is intended to be used.

Having thus fully described our invention, what we claim, and desire to secure by Letters Patent, is—

1. Attaching the plow-beams to the axle B by means of the rock-shaft D, provided with the arms $e$ $e$ and lever C, arranged to operate substantially as and for the purpose set forth.

2. Supporting one end of the rock-shaft D in the adjustable bearing $o$, in combination with the lever E, arranged as shown and described.

3. The tongue H, attached to the front end of the plow-beams, in combination with the segment G and rod $m$, provided with the jam-nuts $l$ $l$, as shown and described.

B. F. GILLILAND.
A. L. GILLILAND.

Witnesses:
JAMES DE WITT,
JAMES L. DE WITT.